Patented Mar. 9, 1954

2,671,787

UNITED STATES PATENT OFFICE 2,671,787

TETRACHLOROBENZOGUANAMINES

Newman M. Bortnick, Oreland, Pa., assignor to Rohm & Haas Company, Philadelphia, Pa., a corporation of Delaware No Drawing. Application June 10, 1952,
Serial No. 292,715

1 Claim. (Cl. 260—249.9)

This invention deals with tetrachlorobenzoguanamines. These compounds act as insecticidal and fungicidal agents and may be used as the active ingredient in horticultural and agricultural sprays and dusts.

Tetrachlorobenzoguanamine has the structure

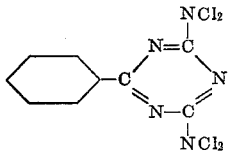

It contains so-called positive chlorine, which can supply active chlorine.

Compounds liberating hypochlorous acid have been suggested as bactericides and disinfectants. Previously known compounds have not, however, been suitable for use on growing plants. Many are ineffective; others rapidly become ineffective. Many are strongly phytotoxic. Tenacity is generally poor.

In contrast thereto tetrachlorobenzoguanamine has fairly good stability, is ordinarily not rapidly decomposed, is nonphytotoxic at required concentrations, is tenaciously held, and is highly active against bacterial and fungal infections of plants and acts over a considerable period of time.

Benzoguanamine is reacted at 15°–35° C. with chlorine by passing chlorine into an actively stirred suspension of benzoguanamine in water. A yellowish product forms which can be filtered off, washed, and if desired, recrystallized.

More specifically 47 parts by weight of benzoguanamine (2-phenyl - 4,6 - diamino - 1,3,5 - triazine) and 750 parts of water are rapidly stirred. Chlorine is bubbled into the mixture for 1.5 hours until more than the theoretical quantity of chlorine has been passed into the reaction mixture. A slightly yellow crystalline product forms. It is filtered off and washed with 2000 parts of water. This crude material melts at 115°–124° C. It is recrystallized from hot acetone. The purified product melts at 134°–139° C. It contains by analysis 42.6% of chlorine (theory 43.6%).

A wettable powder, made from 50 parts of tetrachlorobenzoguanamine, 45 parts of finely particled kaolin, 2 parts of condensed naphthalene sulfonate, and 3 parts of an octylphenoxypolyethoxyethanol, applied to bean plants at the level of 4 pounds of toxicant per 100 gallons, caused an 80% kill of army worm with no injury to the plants. A dust carrying 5% of the test compound gave a 94% kill of army worms on bean plants.

At 0.0009% the above compound gave 100% inhibition of the germination of spores of *Macrosporium sarcinaeforme* in standard fungitoxicity tests. At 0.0035% it gave 100% inhibition of germination of spores of *Sclerotinia fructicola*. The fungicidal effectiveness of tetrachlorobenzoguanamine is five to ten times that of hexachloromelamine, even though this latter compound has theoretically about 50% more available chlorine.

Benzoguanamines can be prepared with different ring substituents and these can be used to modify the activity of the positive chlorines. For example alkyl groups, parachlorine, or the p-methoxy group can be used to moderate activity. On the other hand meta halogen, the m-methoxy group, or the p-nitro group may be used to activate the compound.

I claim:

As a new compound, N,N,N',N'-tetrachlorobenzoguanamine.

NEWMAN M. BORTNICK.

References Cited in the file of this patent

UNITED STATES PATENTS

| Number | Name | Date |
|---|---|---|
| 2,184,883 | Muskat | Dec. 26, 1939 |
| 2,184,886 | Muskat | Dec. 26, 1939 |
| 2,387,547 | Widmer | Oct. 23, 1945 |
| 2,472,361 | Arsem | June 7, 1949 |